United States Patent [19]
Tibbe

[11] 3,944,164
[45] Mar. 16, 1976

[54] STORAGE DEVICE FOR A SAFETY BELT

[75] Inventor: Günter Tibbe, Emmering, Germany

[73] Assignee: Hans Kolb KG, Munich, Germany

[22] Filed: Jan. 20, 1975

[21] Appl. No.: 542,290

[30] Foreign Application Priority Data
Jan. 23, 1974 Germany............................ 2403156
Feb. 5, 1974 Germany............................ 2405460

[52] U.S. Cl............................................. 242/107.4 A
[51] Int. Cl.².......................................... B65H 75/48
[58] Field of Search............... 242/107.4 R, 107.4 A; 280/150 SB; 297/386, 388

[56] References Cited
UNITED STATES PATENTS

| | | | |
|---|---|---|---|
| 3,430,891 | 3/1969 | Burleigh | 242/107.4 |
| 3,508,720 | 4/1970 | Kell | 242/107.4 |
| 3,578,260 | 5/1971 | Kell | 242/107.4 |
| 3,722,824 | 3/1973 | Hayashi | 242/107.4 |
| 3,758,044 | 9/1973 | Nilsson | 242/107.4 |
| 3,770,224 | 11/1973 | Hayashi | 242/107.4 |
| 3,838,831 | 10/1974 | Bell | 242/107.4 |

*Primary Examiner*—Edward J. McCarthy
*Attorney, Agent, or Firm*—Baldwin, Wight & Brown

[57] ABSTRACT

A storage device for a safety belt in which the safety belt is wound up on a shaft rotatably mounted in a housing. A ratchet wheel is carried by the shaft and rotation of the ratchet wheel is arrested by a pawl. The pawl is moved into engagement with the ratchet wheel by an inertia member comprising a ball which, in a normal position of rest, sits on a circular edge of a recess or aperture in a base member. The pawl is of such construction that its tip, which engages with the ratchet wheel, is longitudinally displaceable under a predetermined loading.

9 Claims, 10 Drawing Figures

STORAGE DEVICE FOR A SAFETY BELT

Storage devices for safety-belts, in which the belt is wound up on a reel, are finding more and more acceptance in motor vehicles. They serve for protecting the belt when not being worn and for so holding it, in readiness, that the safety belt can at any time, immediately be put on. The belt is pulled out, i.e. unwound from the reel, against the action of a spring force which, when the safety belt is taken off, causes the belt to reel up again.

In such devices, the belt must be locked in the pull-out direction, when the vehicle concerned is decelerated in order that the safety belt fulfils its proper function, that is to say holds the seat occupant, in the vehicle, in his seat. If it were not for this locking of the belt, the occupant would be hurled forwards out of his seat.

Belt-sensitive and/or vehicle-sensitive, inertia locking mechanism are known which lock the belt against pull-out or withdrawal from the storage device or reel, at a specific belt pull-out acceleration of, for example, 1g, or at a specific vehicle deceleration of, for example, 0.4g, that is to say, at about half of the vehicle deceleration which takes place in an emergency braking.

The storage devices, for rolling up the belt, have a winding or coiling shaft, rotatably mounted in a housing, to which shaft the belt is secured at one end and which shaft is at one end connected to a spiral tension spring. The spiral spring loads the winding or coiling shaft in such a direction of rotation that the belt is reeled up on to the shaft. As a rule, at the other end of the winding or coiling shaft there is proved the belt-sensitive and/or vehicle-sensitive device for locking the belt against pull-out or withdrawal from the storage device.

For vehicle-sensitive locking of the belt, in the direction of pull-out, it is known to mount a ratchet wheel fast on the rotatable winding or coiling shaft with which ratchet wheel a detent or pawl is capable of being made to engage, under the influence of a movable inertia member. The inertia member may comprise a ball resting in a support. When the ball moves out of the resting position, the detent or pawl is caused to move into engagement with the ratchet wheel, thereby locking it and the shaft against rotation in a belt pull-out direction. Instead of a ball, the inertia member may comprise an inverted frustro-conical member standing on its smaller diameter end and cpaable of tilting at a specific deceleration of the vehicle to actuate locking of the belt.

It is also known to mount the ratchet wheel on the winding or coiling shaft so that, within limits, it can turn and move axially relative to the winding or coiling shaft. Thus the ratchet wheel may have an internal screw thread and the winding or coiling shaft may have a corresponding external screw thread. The ratchet wheel may have peripheral teeth and an annular set of teeth on an end face, the latter being adapted to engage, upon axial displacement of the ratchet wheel, with teeth fixed with or part of a main housing of the storage device. When the detent or pawl is brought into engagement with the peripheral teeth, of the ratchet wheel, upon displacement of the inertia member, the ratchet wheel is held against further rotation and with a slight turning of the winding or coiling shaft, through pull on the safety belt, the ratchet wheel moves axially against the action of a restoring spring, so that the teeth on the face end come into engagement with the teeth fixed with or part of the main housing. Thus the ratchet wheel and the winding or coiling shaft are locked against rotation and further pull-out or withdrawal of the belt is prevented.

This latter construction is, moreover, belt-sensitive in that the ratchet wheel itself is an inertia member; that is to say when the belt if pulled out with sudden acceleration of for example, 1g, the ratchet wheel, in angular movement lags behind the winding or coiling shaft so that the shaft rotates relative to the ratchet wheel, whereby the ratchet wheel is displaced axially into locking engagement with the fixed teeth on the main housing. A further turning of the winding or coiling shaft is therefore arrested and belt pull-out is blocked.

In the case of the described vehicle-sensitive inertia locking mechanism, with a spherical ball as the inertia member, actuation of the locking mechanism is not precisely defined; that is to say it does not always take place at exactly the desired level of vehicle deceleration. Also, locking can come into effect when the vehicle concerned is parked on a slope and stands at an angle, without acceleration or deceleration of the vehicle, in any dirction, being present.

In those devices with vehicle-sensitive, belt locking and a toothed wheel which is rotatable and axially moveable relative to the winding or coiling shaft, difficulties arise, particularly in view of the manufacturing tolerances, the elastic deformations of the engaging components and the possibility that the teeth on the end face of the ratchet wheel and on the main housing may stand point to point and not engage properly with each other. Furthermore, these devices have comparatively large dimensions, especially in the region of the toothed wheel, of the detent or pawl co-operating therewith and of the body of inertia actuating the latter; the toothed wheel is comparatively large and therefore the detent (or pawl) and the inertia member have to be arranged relatively for from the axis of rotation of the winding or coiling shaft.

The present invention seeks to provide a safety belt storage device and inertia locking mechanism which overcomes the disadvantages and difficulties set out above.

According to a feature of the present invention there is provided a storage device for a safety belt with vehicle-sensitive locking of the belt in the direction of pull-out, including a winding or coiling shaft rotatably mounted in a housing, a ratchet wheel provided with peripheral teeth and with teeth on an end face, said ratchet wheel being axially movable on the winding or coiling shaft, a detent or pawl, an inertia member for moving the detent or pawl into engagement with the peripheral teeth of the ratchet wheel and teeth fast with the housing with which the end face teeth of the ratchet wheel co-operate and lock upon axial displacement thereof, wherein the detent or pawl is formed with a tip to engage the peripheral teeth of the ratchet wheel, said tip, under a predetermined loading, being displaceable longitudinally of the pawl.

By the present invention there is also provided a storage device for a safety belt with vehicle-sensitive locking of the belt in the direction of pull-out, including a rotatably mounted winding shaft, about which the belt is coiled, means to lock the shaft against rotation in a belt withdrawal direction and an inertia member to actuate said locking means, said inertia member comprising a ball resting on a circular edge on a base support and adapted to tilt about said edge upon acceleration or deceleration of the vehicle in excess of a predetermined value.

Embodiments of the present invention are now described, by way of example, with reference to the accompanying drawings, in which FIG. 1 shows the longitudinal section along the line I—I in FIG. 2 through a first embodiment;

In the following description, like reference numerals are used to identify like parts.

Figure 1:
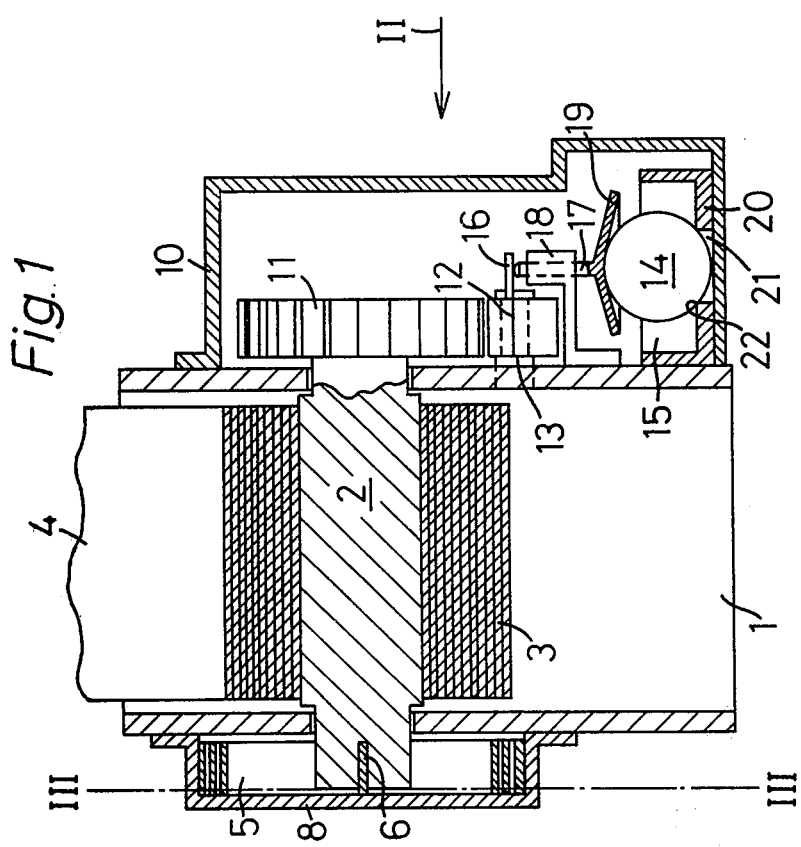

Referring to the drawings, the mechanism includes a housing 1 in which is rotatably mounted a winding or coiling shaft 2 on which is a coil 3 of webbing comprising a safety belt 4. The belt 4, at one end, is secured to the shaft 2 and its other, free, end extends from the housing 1.

Figure 3:
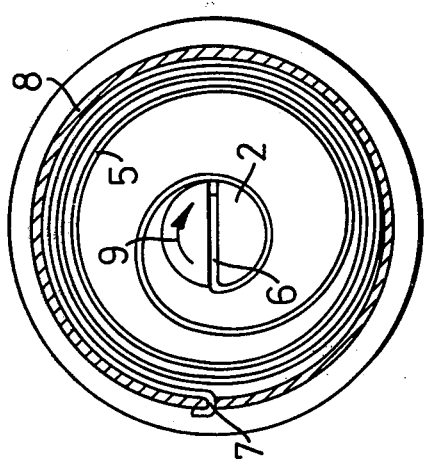
FIG. 3 shows the section along the line III—III in FIG. 1.
Figure 4:
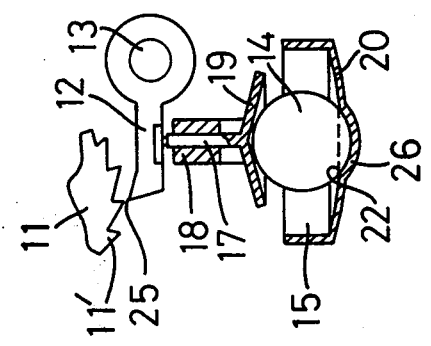
FIG. 4 shows schematically a view (corresponding to FIG. 2) of a second embodiment.
Figure 5:
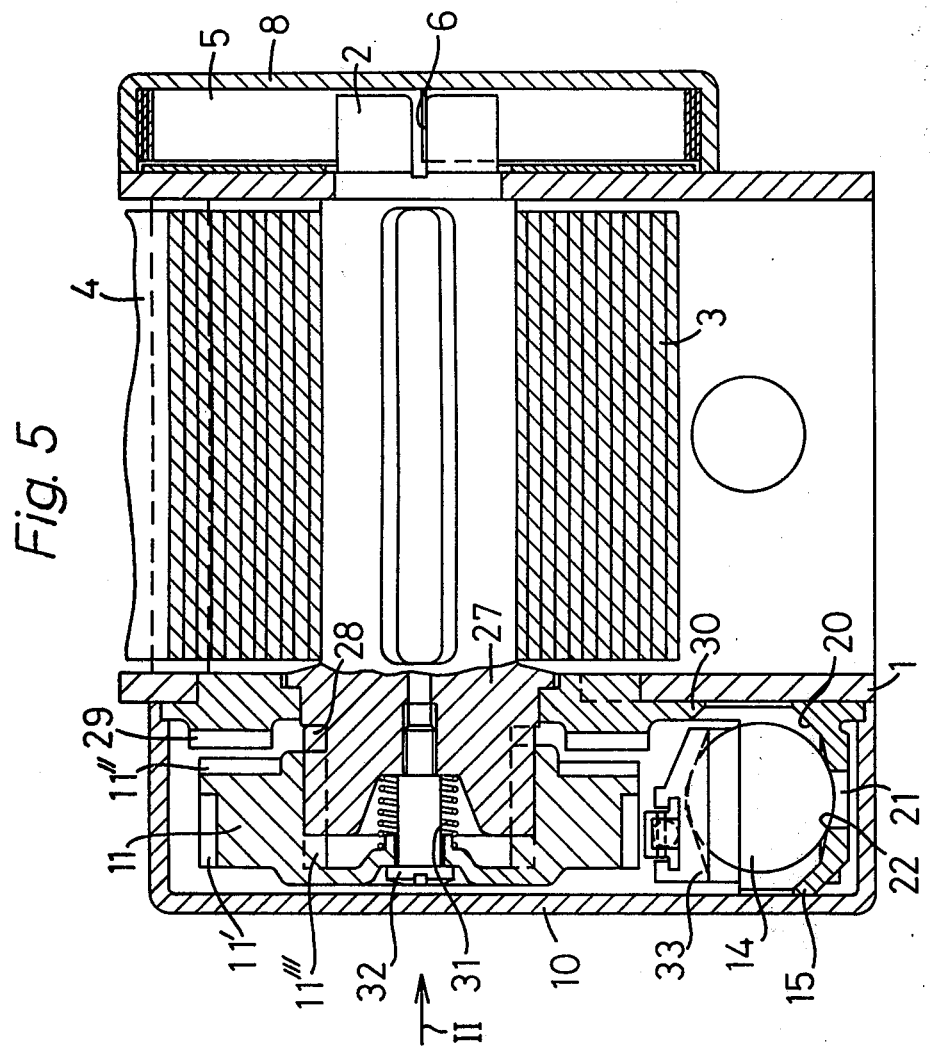
FIG. 5 shows the longitudinal section along the line I—I in FIG. 6 through a third embodiment.
Figure 6:
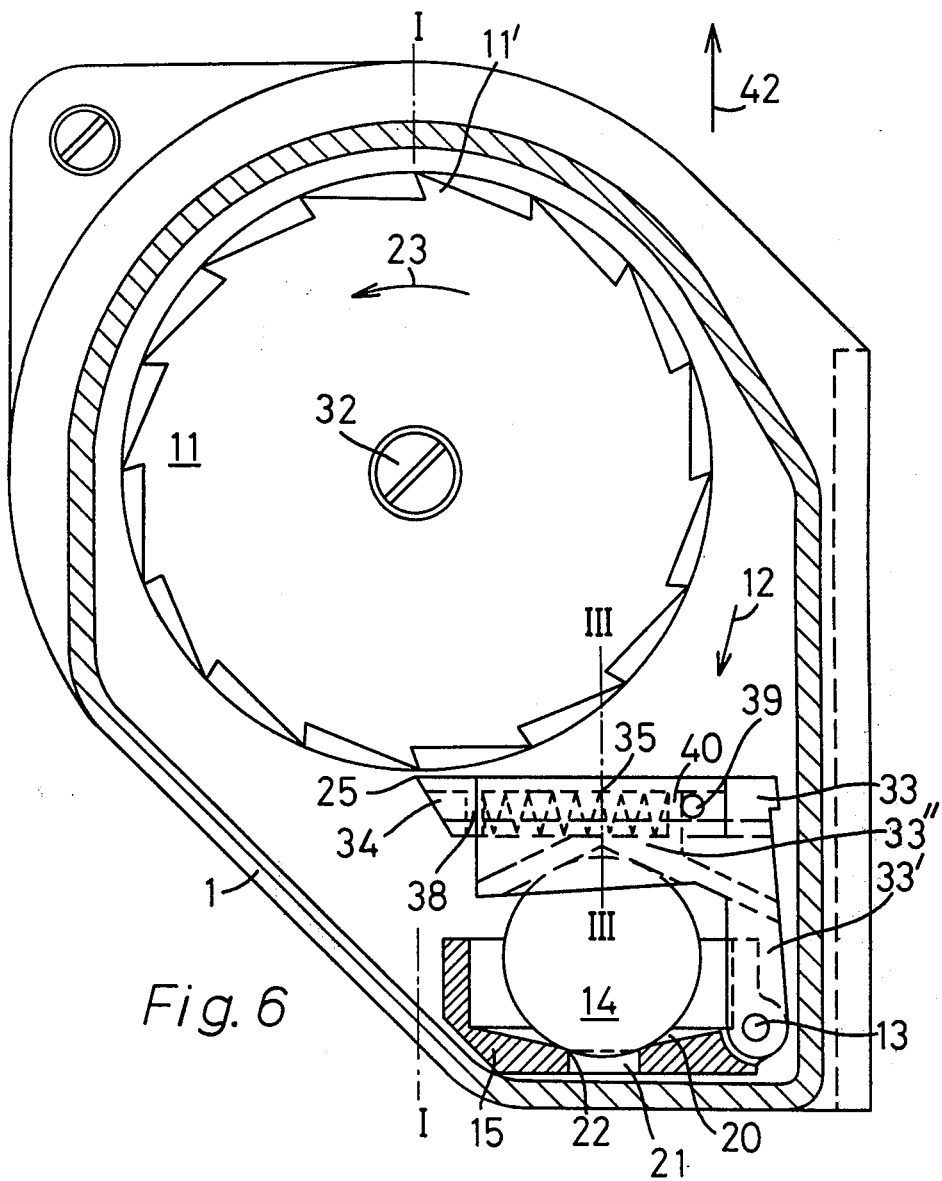
FIG. 6 shows the side view in the direction of the arrow II in FIG. 5; the front housing cover is removed and some components are shown in longitudinal section.
Figure 7:
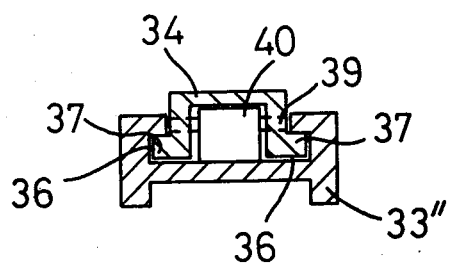
FIGS. 7 and 8 show the section along the line III—III in FIG. 6 through the detent or pawl and the plan view of the detent or pawl according to FIG. 6.
Figure 8:
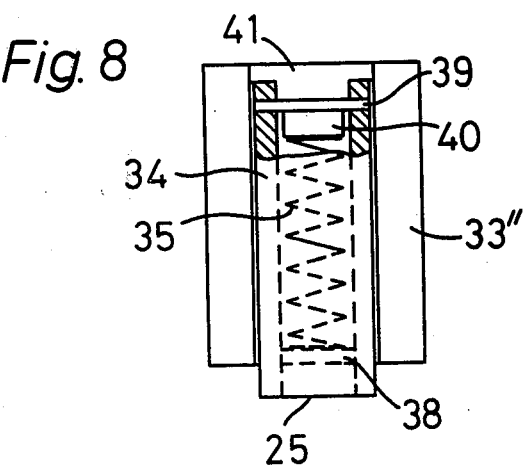

On one side of the housing there is provided a spiral, tension spring 5 with as flat a characteristic line as possible, which spring is secured at its inner end 6, to the shaft 2 and at its outer end 7 to a cover 8 which is screwed to the housing 1. When the belt 4 is pulled out of the housing 1, when the safety belt is put on, the shaft 2 rotates in the direction of the arrow 9 (see FIG. 3) and the spiral spring 5 is tensioned. When the safety belt is taken off, the belt 4 is automatically pulled into the housing 1 and wound or rolled on to the shaft 2, under the action of the spring loading of the tension spring 5.

Inside a cover 10, screwed to the housing 1, there is provided at the other end of the winding or coiling shaft 2, a ratchet wheel 11 with peripheral teeth 11' of saw-tooth profile. Adjacent the ratchet wheel 11 there is pivotally mounted about a pin 13 fixed to the housing, a detent or pawl 12 which can be actuated by an inertia member in the form of ball 14. The ball 14 rests in a cage 15 fast with the housing 1.

In the embodiment according to FIGS. 1 to 4, the toothed wheel 11 is secured to the winding or coiling shaft 2 and the detent or pawl 12 is arranged below the ratchet wheel 11 with a lateral tongue 16 of the pawl, supported on an actuating pin 17. This pin 17 is slidably mounted in a guideway 18 stationary with the housing and at its lower end has a socket 19 which lies on the ball 14.

Figure 2:
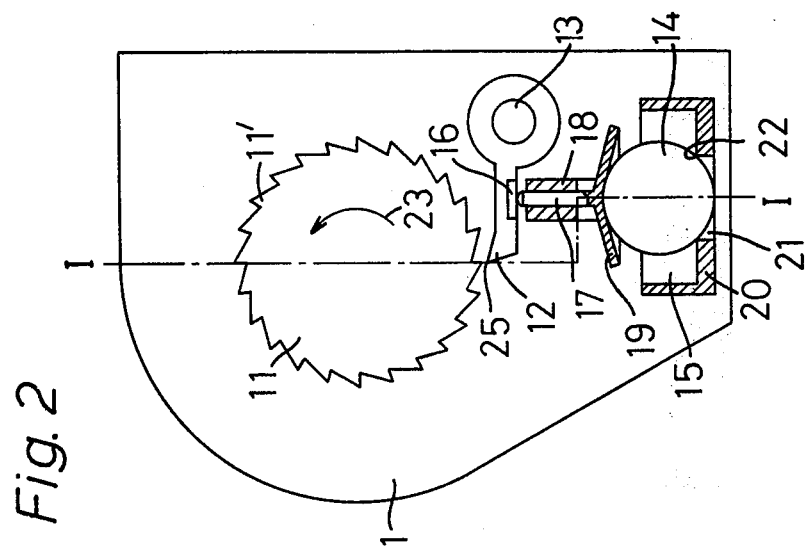
FIG. 2 shows the side view in the direction of the arrow II in FIG. 1; the front housing cover is removed and some components are shown in longitudinal section.

The cage 15, in the embodiment according to FIGS. 1 and 2, has a flat base 20 formed with a circular opening 21 to receive the ball 14. In the resting position, shown in FIGS. 1 and 2, the ball 14 sits on the circular edge 22 of the opening 21 and the detent or pawl 12 is out of engagement with the peripheral teeth 11' of the ratchet wheel. The ratchet wheel 11 is, therefore, free to rotate in the direction of the arrow 25 for pulling the belt 4 out of the housing 1 or vice versa.

When a relative acceleration between ball 14 and cage 15 takes place, caused by a corresponding deceleration of the vehicle in which the mechanism is mounted, the ball 14, upon a specific critical value of the relative acceleration being exceeded, tilts about the edge 22 out of the opening 21. This results in a lifting of the actuating pin 17 away from the cage 15 whereby the detent or pawl 12 is pivoted to bring a tip 25, of the pawl, into engagement with the peripheral teeth 11' of the ratchet wheel 11. When this engagement occurs, the ratchet wheel 11 is locked against rotation in the direction of the arrow 23 and thereby the belt is positively held against further withdrawal from the housing 1.

The socket 19 is shown as being conical in form, but can be plane and extend parallel to the cage base 20. Likewise, the cage base 20 need not necessarily be plane but may also be conical in form, as in the embodiment according to FIG. 4. From this it can be seen that, instead of the base opening 21, a depression or recess 26 may be provided which, in order to receive the ball 14, is correspondingly spherically concave and, with the conical base 20, provides the circular edge 22. The cage 15 and the guideway 18 may be formed on a one-piece component, preferably of plastics material, which is secured to the housing 1.

Also, in the embodiment according to FIGS. 1 to 4 it is possible to arrange the ratchet wheel 11 in screwable manner on the coiling shaft 2 by means of a worm, to provide the ratchet wheel 11 with teeth on an end face and, by means of a spring, to bias the ratchet wheel away from teeth fast with the housing. Thus, when the pawl 12 engages the peripheral teeth 11' of the ratchet wheel 11 and there is a simultaneous pull on the belt 4 with slight turning of the shaft 2, the ratchet wheel 11 moves axially against the action of the spring and the teeth on the end face of the ratchet wheel come into engagement and lock with the fixed teeth on the housing, to lock the shaft 2 against rotation. The teeth fast with the housing may be formed on a component secured to the housing 1, in particular from plastics materials, from which also the cage 15 and, where appropriate, the guideway 18 are formed.

In FIGS. 5 to 10, such embodiments are shown. The ratchet wheel 11 has, besides the peripheral teeth 11', teeth 11'' on an end face, and an internal screw thread 11''', the coiling shaft 2 extends with a section 27 into the ratchet wheel 11. On the section 27 is provided an external screw thread 28 which co-operates with the internal screw thread 11''', of the ratchet wheel 11. Fixed teeth 29 are provided on the housing opposite the teeth 11'' on the end face of the ratchet wheel. These fixed teeth 29 are formed on a component 30, stationary with the housing, consisting of plastics material. Between the coiling shaft 2 and the ratchet wheel 11 is a restoring spring 31 which biases the ratchet wheel 11 away from the fixed teeth 29 and against a stop 32. In the embodiments according to FIGS. 5 to 10, the stop 32 is formed by the head of a screw screwed into the coiling shaft 2.

In this embodiment the pawl 12 consists of a carrier 33, a locking slider 34, which is longitudinally slidable with respect to the carrier 33, and a spring 35. The carrier 33 rests on the ball 14, the cage 15 of which has a conical bottom 20 and a bottom opening 21 (or a bottom concavity 26) to receive the ball 14. In the resting position reproduced in the drawing, the ball 14 lies on the circular edge 22 of the opening 21 (or of the concavity 26) and the pawl 12 is out of engagement with the peripheral teeth 11' of the ratchet wheel 11.

When a relative acceleration between the ball 14 and the cage 15 takes place, caused by a corresponding deceleration of the vehicle in which the storage device is fitted, the ball 14, upon a specific predetermined value of the relative acceleration being exceeded, tilts around the edge 22 out of the opening 21. This results in the pawl 12 being pivoted into engagement with the peripheral teeth 11' of the ratchet wheel 11, so that rotation of the ratchet wheel 11 in the direction of the arrow 23, is arrested. By the pull exerted on the belt 4, however, the coiling shaft 2 is turned slightly further, in the direction of the arrow 23, so that the ratchet wheel 11, against the action of the spring 31, screws on to the coiling shaft 2, i.e. is axially displaced, until the teeth 11" come into engagement with the teeth 29 stationary with the housing. The belt is thus locked against further withdrawal from the housing 1.

The pawl 12 may be formed as an angled lever 33, with two arms 33' and 33". The arm 33" carries the locking slider 34. As is seen particularly distinctly from FIG. 7, the arm 33" has two lateral longitudinal grooves 36 into which engage two corresponding longitudinal projections 37 of the locking slider 34. Furthermore, the locking slider 34 has, near the free end edge 25, a support 38 for a spring 35 which, at the end remote from the end edge 25 bears against a stop 40 on the angled lever 33 or on the angled-lever arm 33". The spring biasses the locking slider 34 to project beyond the free end of the arm 33" and this movement is limited by a cross bar 39, across the end 41 of the locking slider, coming up against the stop 40.

Cage 15 and ball 14 are arranged below the toothed wheel 11. The arm 33" of the angled lever 33, which extends approximately horizontally and carries the locking slider 34, lies on the ball 14. The other arm 33" extends approximately vertically and at its lower free end is pivotally mounted on a pin 13 fixed to the housing.

Figure 9:
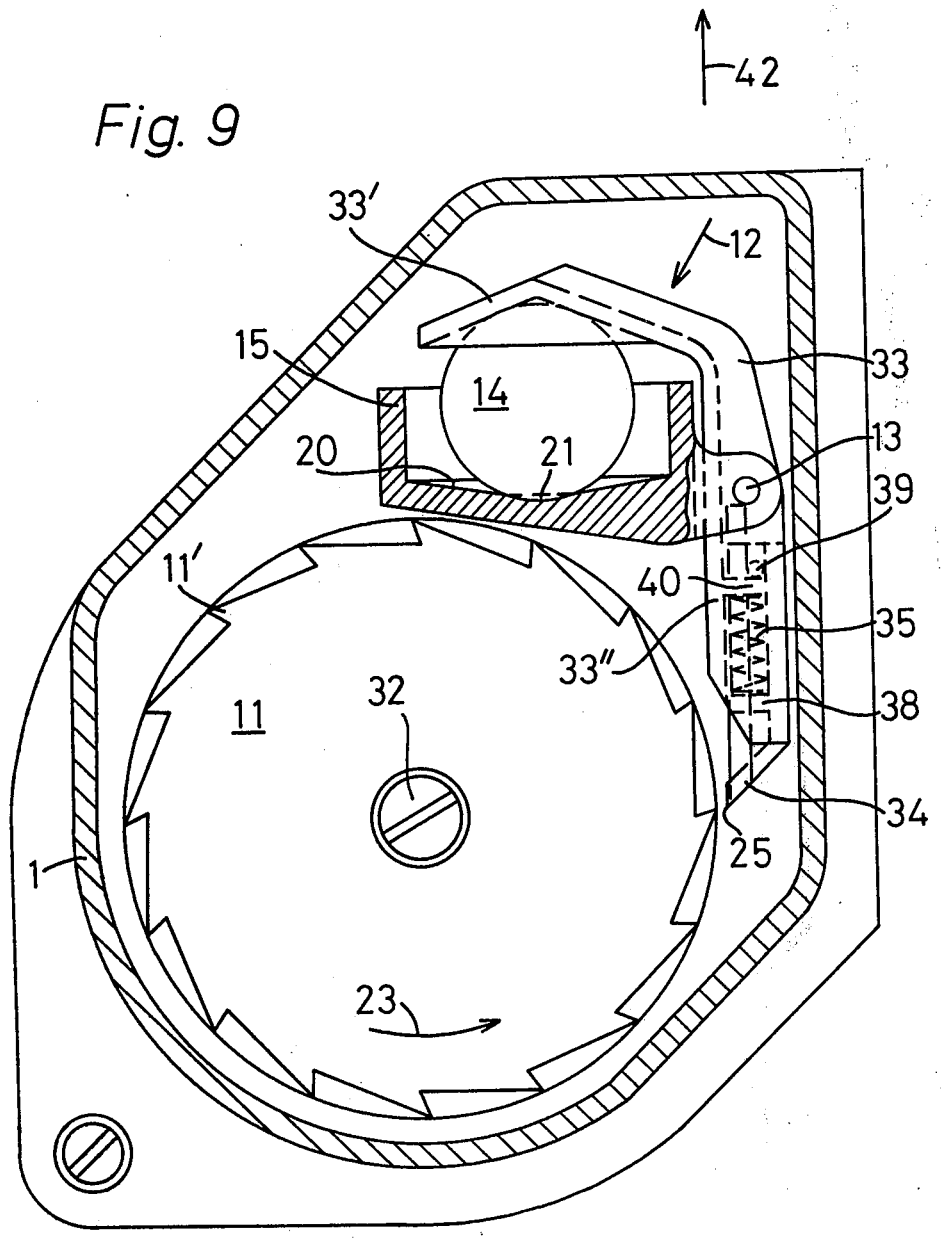
FIGS. 9 and 10 show respectively a view (corresponding to FIG. 6) of a fourth and fifth embodiment.

The embodiment according to FIG. 9 differs from that according to FIGS. 5 to 8 in that cage 15 and ball 14 are arranged above the ratchet wheel 11. The angled lever 33 is pivoted about the axle 13, at the junction between the two arms 33' and 33". The horizontal arm 33' lies on the ball 14 and the locking slider 34 is provided on the other, vertical arm 33". The locking slider 34 is longitudinally slidable in the arm 33" via longitudinal grooves and longitudinal projections.

Figure 10:
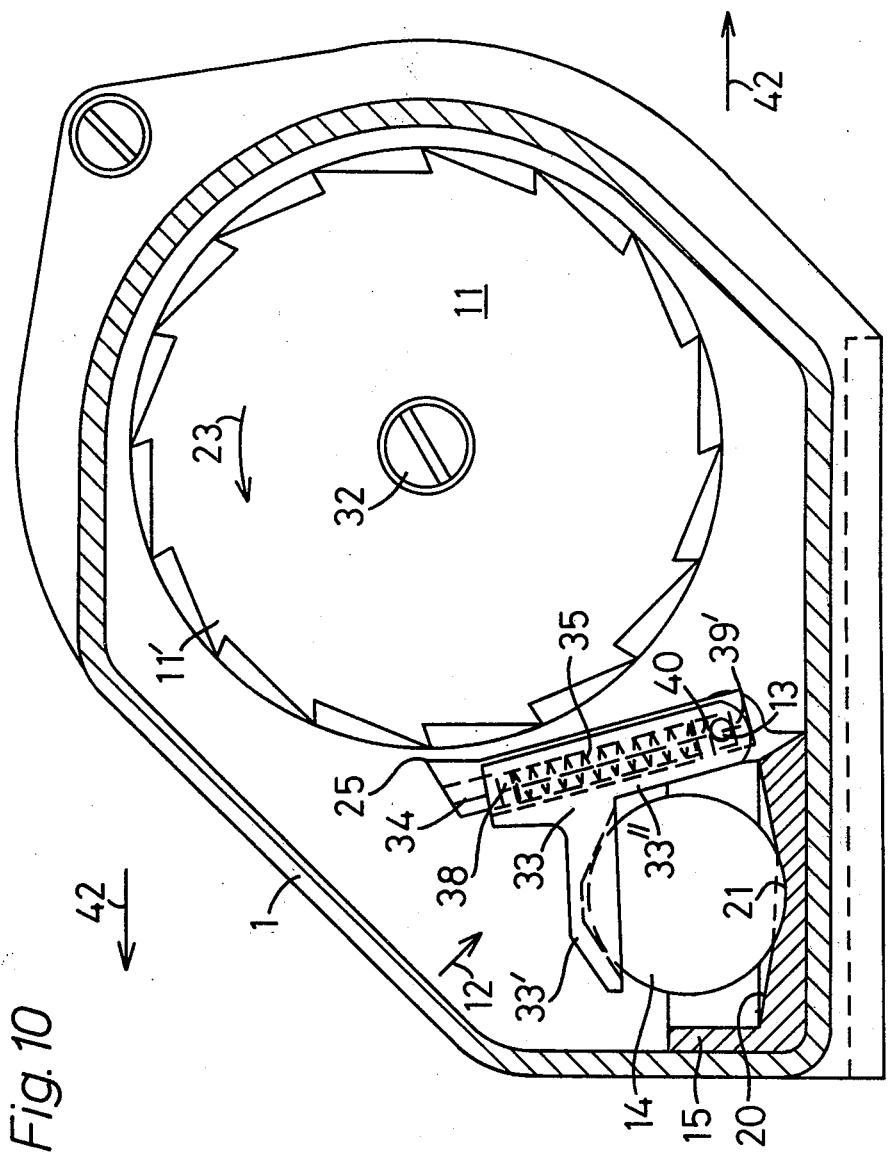

In the embodiment according to FIG. 10, cage 15 and ball 14 are arranged laterally beside the ratchet wheel 11. The angled lever 33 lies, with the approximately horizontal arm 33', on the ball 14, while the other arm 33" carrying the locking slider 34 extends approximately vertically. The free end of the arm 33" is povoted about the pin 13 to the housing 1.

The embodiments according to FIGS. 5 to 8 or 9 are particularly suitable for motor vehicle front seat safety belts; the embodiment according to FIG. 10 is suitable for, above all, safety belts of motor vehicle rear seats.

The direction of pullout of the belt is, in each case, shown by the arrow 42.

What I claim is:

1. A storage device for a safety belt with vehicle-sensitive locking of the belt in the direction of pullout, said device comprising a housing, a coiling shaft rotatably mounted in said housing, a ratchet wheel provided with peripheral teeth and with teeth on an end face, said ratchet wheel being axially movable on said coiling shaft, a pawl, an inertia member for moving said pawl into engagement with the peripheral teeth of the ratchet wheel, and teeth fast with the housing with which the end face teeth of the ratchet wheel co-operate and lock upon axial displacement of said ratchet, the pawl including a separately formed tip for engaging the peripheral teeth of the ratchet wheel, and means mounting said tip for displacement longitudinally of the remainder of said pawl under a predetermined loading in response to engagement with said ratchet wheel peripheral teeth.

2. A storage device according to claim 1 wherein the tip includes a locking slider slidably mounted against a spring bias in the pawl.

3. A storage device according to claim 2, wherein the pawl comprises an angled lever rotatably mounted on the housing, said angled lever having a first arm which carries the locking slider.

4. A storage device according to claim 3, wherein the arm carrying the locking slider rests on the inertia member in the form of a ball movable in a cage stationary with the housing, and said angled lever has a second arm with a free end pivotally joined to the housing.

5. A storage device according to claim 3, wherein the angled lever has a second arm, the angled lever being pivotally mounted on the housing at the junction between the first and second arms, the first arm carrying the locking slider and the second arm resting on the inertia member which is in the form of a ball movable in a cage stationary with the housing.

6. A storage device according to claim 3 wherein the first arm has a free end pivotally joined to the housing, and the angled lever has a second arm which lies on the inertia member which is in the form of a ball movable in a cage stationary with the housing.

7. A storage device according to claim 1 wherein said inertia member comprises a ball resting on a circular edge of an opening in a base support, said ball being adapted to roll over said edge upon acceleration or decceleration of the vehicle in excess of a predetermined value, said pawl including an arm portion, and said arm portion resting freely on said ball whereby said pawl is moved into engagement with the peripheral teeth of the ratchet wheel.

8. A storage device according to claim 7 wherein said base support is conically dished towards said opening in said base support to automatically return said ball to said opening to rest on said circular edge thereof.

9. A storage device according to claim 1 wherein that portion of said pawl having said tip is directed tangentially with respect to the peripheral teeth of said ratchet wheel and said tip is arranged for displacement in a tangential direction relative to said ratchet wheel to enable engagement between the teeth on the end face of said ratchet wheel and the teeth fast with the housing.

* * * * *